Oct. 6, 1931. J. WILCZYNSKI 1,825,687
REVERSIBLE NONGLARING REAR VISION MIRROR FOR AUTOMOBILES
Filed March 28, 1928
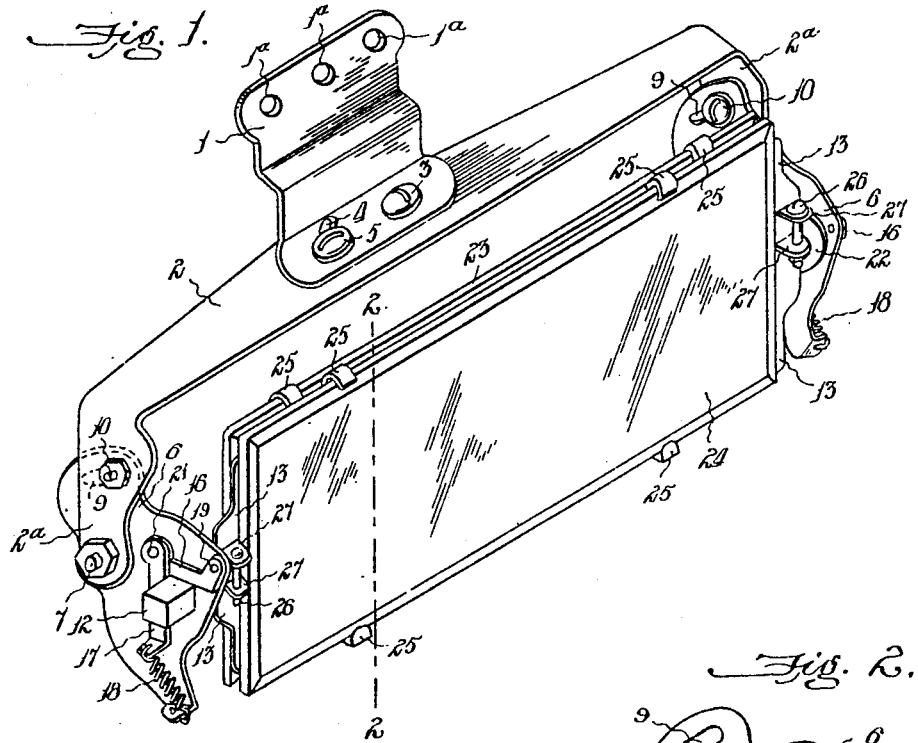
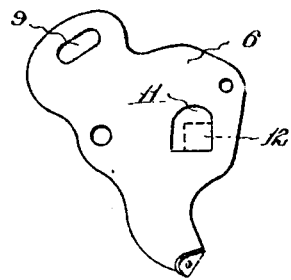
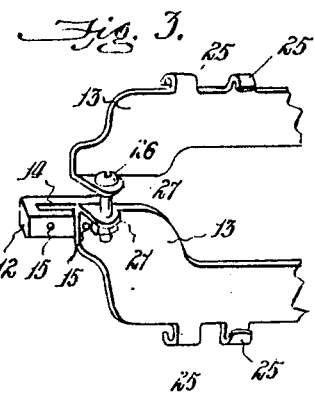
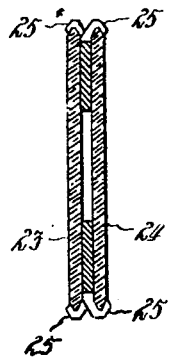
John Wilczynski
INVENTOR.
BY
ATTORNEY.

Patented Oct. 6, 1931

1,825,687

UNITED STATES PATENT OFFICE

JOHN WILCZYNSKI, OF BUFFALO, NEW YORK

REVERSIBLE NONGLARING REAR-VISION MIRROR FOR AUTOMOBILES

Application filed March 28, 1928. Serial No. 265,382.

My invention relates to rear-vision mirrors for automobiles and more especially to that particular type in which two mirrors of different reflecting power are supported back to back and are reversible so that either one may be brought into operative position by the driver—one being in the form of an ordinary mirror for use in daylight and the other providing a mirror for night driving which will reduce the brilliancy of the reflected headlights of an automobile approaching from the rear.

The principal object of my present invention is to provide an automobile accessory of this character in which the mirrors can be conveniently manipulated in reversing the same, and in which the bracket and parts supporting the mirrors can be readily adjusted for the required focal angle.

A further object of the invention is to provide a rear-vision reversible mirror which will be strong and durable in construction, simple in operation, and in which the mirrors are detachably connected to the frames for convenience in replacing the same in the event either one or both should become broken or otherwise injured.

Other objects and advantages of my invention will hereinafter appear, and what I particularly claim as new and desire to secure by Letters Patent is more specifically set forth in the appended claims.

In the drawings

Figure 1 is a perspective view of the rear-vision mirror constructed in accordance with my invention.

Figure 2 is a detailed view in perspective of one of the supporting plates of the bracket in which the frame supporting the mirror is connected.

Figure 3 is a fragmentary perspective view of the two-part adjustable mirror frame.

Figure 4 is a sectional view taken on line 2—2, Figure 1, and looking in the direction of the arrows.

In carrying out my invention I employ a supporting bracket in the form of a metal strip 2 having depending members 2a—2a at the ends thereof from which the mirrors are supported by adjustable plates 6—6, the said metal strip being provided centrally with an angular attaching plate 1 secured thereto by bolts or screws 3 and 5, one of which passes through a slot 4 in the attaching plate for adjustment of the parts one upon the other to secure lateral or focal adjustment with respect to the required rear vision while the other part of said attaching plate is provided with screw holes 1a for securing the device in place on the automobile. The plates 6—6 are secured to the inner side of the depending members 2a of the bracket by bolts 7 and 10, the upper bolt 10 passing through a slot 9 in the plate for vertical adjustment of the outer end of the latter with respect to the bracket, and each plate is provided near its outer end with an opening 11 through which a gudgeon 12 at the end of the mirror supporting frame passes whereby said frame is reversible for bringing either one of the mirrors 23 and 24 carried thereby in forward or operative position, the aforesaid opening 11 in the plates being substantially rectangular in shape, and to hold the mirror supporting frame in either position the gudgeons or pivots 12 are also rectangular in cross section presenting flat sides which engage the angular portion of the openings 11 and are engaged by spring-actuated latches. The preferred form of latch employed comprises two members 16 and 17 pivoted together at 21 and to the supporting plate 6 at the forward end thereof by pivot 19 so that the latch members will engage the squared gudgeons at an angle to each other, as shown in Figure 1, the free end of the member 17 being turned outwardly for attachment thereto of the actuating spring 18, the other end of which latter is secured to a similarly out-turned lower end of the plate. It will be noted by reference to Fig. 2 that the opening 11 in the plates 6 presents front and bottom walls at right angles to each other connected by an outwardly curved wall permitting the square gudgeon to turn in said opening, the vertical wall being towards the front of the plate so that the spring-actuated members of the latch will bear against the upper and rear surfaces of the gudgeon to yieldingly press the same in the angular corner of said opening.

Although any desired form of mirror supporting frame may be employed in connection with the bracket and supporting arms adjustably secured thereto the two-part frame shown and hereinafter particularly described is a part of my invention and being formed of metal plates 13—13 the square gudgeons 12 of thicker metal are secured to the ends of one of said plates by short metal pieces 14 riveted to the parts respectively as indicated at 15.

The mirror supporting frame consists of the two longitudinal plates 13—13 slightly longer than the mirrors and cut away at their inner edges to reduce the weight of the frame, being connected at their extended ends by bolts 26 passing through outstanding ears 27, and for holding the glass mirrors at the opposite sides of the frame the outer edges of the parts or sections of the supporting frame are provided with integral clips 25 turned in opposite directions for engaging the upper and lower edges of the plate-glass mirrors, as shown in Figs. 3 and 4, said clips being clamped against the edges of the mirrors by tightening the bolts 26. When the frame carrying the mirrors is mounted between the adjustable plates of the bracket washers 22 on the gudgeons are interposed between said plates and ends of the mirror supporting frame (see Fig. 1) so that the mirrors can be more easily reversed, said washers bearing against the outstanding ears 27 of the mirror supporting frame and against the inner face of the adjustable bracket plates.

From the foregoing description of the construction of my rear-vision mirror the operation of the same will be readily understood for in securing it in place at the inner side of the front of the automobile the bracket and supporting plates for the detachable mirror are adjusted by means of the bolts 5 and 10 to position said mirror with respect to the desired rear vision to be reflected therein, and for daylight driving the plain mirror 23 is brought into position (as shown in Fig. 1) and for modifying the glare from automobile headlights in night driving or for subduing the intense reflection of sunlight the mirror 24 having a reduced intensity of reflection is brought into position by turning the mirrors, in which operation the spring actuated latch members will yield to permit the square pivots or gudgeons to turn in their bearings in the plates 6 of the supporting bracket, said latch members engaging the surfaces of the gudgeons at right angles to each other to hold the mirrors in reversed position. From this it will be obvious that the rear vision mirror can be quickly reversed according to the degree of reflection desired.

For the subdued reflection I prefer pot blue glass produced by grinding one side of the glass with emery to make the surface opaque which is then silvered, whereby glaring or intense reflection is absorbed to provide a non-glaring rear-vision mirror.

While I have described the preferred embodiment of my invention, and have illustrated the same in the accompanying drawings, certain minor changes or alternations may appear to one skilled in the art to which this invention relates, during manufacture of the same, and I therefore, reserve the right to make such alterations or changes as shall fairly fall within the scope of the appended claims.

What I claim is:

1. A reversible rear vision device for automobiles, comprising a supporting bracket having openings with walls disposed at right angles to each other, a reversible double mirror having squared pivots at its ends received in the aforesaid openings for supporting the mirror in the bracket and adapted to engage the angular disposed walls in either position of the mirror, and means yieldingly engaging the flat surfaces of said pivots permitting the mirrors to be reversed and held in different positions.

2. A reversible rear vision device for automobiles, comprising a supporting bracket having pivot bearings with walls at right angles to each other, a reversible frame carrying a double mirror and having squared pivots engaging the angular walls in either position of the mirror, and a spring-actuated latch yieldingly engaging the flat surfaces of said pivots permitting the mirrors to be reversed and held in different positions.

3. A reversible rear vision device for automobiles, comprising a supporting bracket having pivot bearings with walls at right angles to each other, a reversible frame carrying a double mirror and having squared pivots received in the pivot bearings for supporting the mirror in the bracket, and a spring-actuated latch engaging the flat surfaces of the squared pivots to permit the mirrors to be reversed and for holding the same in different positions under spring tension; together with means for adjusting the mirror supporting bracket.

4. A rear vision device for automobiles, comprising a supporting bracket, a frame carrying a double mirror, squared pivots connecting the mirror-frame to the bracket, and a spring-actuated latch engaging the flat surfaces of the pivots at right angles to each other and consisting of two members pivoted together and to one of the parts with a spring exerting tension on said members.

5. A rear vision device for automobiles, comprising a supporting bracket having forwardly projecting plates with openings therein each having two walls at right angles to each other, a reversible double mirror having squared pivots adapted to bear against said walls of the openings in either position of the mirror, and means yieldingly engaging the flat surfaces of the pivots to hold the mirrors in different positions.

6. A rear vision device for automobiles, comprising a supporting bracket, plates adjustably connected to the supporting bracket to project forwardly therefrom and having openings therein with two walls of each opening disposed at right angles to each other, a reversible double mirror having squared pivots adapted to bear against said walls of the openings in either position of the mirror, and means yieldingly engaging the flat surfaces of the pivots to hold the mirrors in different positions.

7. A rear vision device for automobiles, comprising a supporting bracket having depending end members, an angular attaching plate adjustably secured to said bracket, plates adjustably secured to the end members to project forwardly therefrom and having openings therein with two of the walls of each opening disposed at right angles to each other, a reversible double mirror having squared pivots adapted to bear against said walls of the openings in either position of the mirror, and means yieldingly engaging the flat surfaces of the pivots to hold the mirrors in different positions.

In testimony whereof, I hereunto affix my signature.

JOHN WILCZYNSKI.